United States Patent
Wang

(10) Patent No.: US 12,351,110 B2
(45) Date of Patent: Jul. 8, 2025

(54) METHOD FOR CONSTRUCTING 3D PANORAMIC VIEW MODEL, VEHICLE-MOUNTED DEVICE, AND STORAGE MEDIUM

(71) Applicant: HON HAI PRECISION INDUSTRY CO., LTD., New Taipei (TW)

(72) Inventor: Hao-Ting Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/637,227

(22) Filed: Apr. 16, 2024

(65) Prior Publication Data

US 2025/0178535 A1 Jun. 5, 2025

(30) Foreign Application Priority Data

Dec. 5, 2023 (CN) .......................... 202311662408.0

(51) Int. Cl.
*B60R 1/27* (2022.01)
*B60K 35/21* (2024.01)

(52) U.S. Cl.
CPC .............. *B60R 1/27* (2022.01); *B60K 35/211* (2024.01); *B60K 2360/179* (2024.01); *B60K 2360/21* (2024.01); *B60R 2300/102* (2013.01); *B60R 2300/30* (2013.01)

(58) Field of Classification Search
CPC . B60R 1/27; B60R 2300/102; B60R 2300/30; B60K 35/211; B60K 2360/21; B60K 2360/179
USPC ......................................................... 348/837
See application file for complete search history.

(56) References Cited

FOREIGN PATENT DOCUMENTS

WO   WO-2023192753 A1 * 10/2023   ............... B60R 1/27

* cited by examiner

*Primary Examiner* — Nguyen T Truong
(74) *Attorney, Agent, or Firm* — ScienBiziP, P.C.

(57) ABSTRACT

A method for constructing a 3D panoramic view model is provided using a vehicle-mounted device. The method includes identifying a target object in an environment image, and determines first coordinates of the target object in a first coordinate system corresponding to the environment image. The environment image is converted to an aerial view, and second coordinates of the target object are determined in a second coordinate system corresponding to the aerial view. A third coordinate of the target object is determined in a third coordinate system. A fourth coordinate of the target object is determined in a fourth coordinate system, and an initial distance is determined between the target object and a vehicle. A target distance is determined and a target 3D panoramic view model of the vehicle is constructed according to the target distance and the environment image. The method improves the safety of users driving.

20 Claims, 10 Drawing Sheets

METHOD FOR CONSTRUCTING 3D PANORAMIC VIEW MODEL, VEHICLE-MOUNTED DEVICE, AND STORAGE MEDIUM

FIELD

The present disclosure relates to a field of intelligent driving, and more particularly to a method for constructing a 3D panoramic view model, a vehicle-mounted device, and a storage medium.

BACKGROUND

A panoramic surrounding view system installed inside a vehicle can capture images around the vehicle through cameras, which are installed in the front, rear, left and right of the vehicle. The panoramic surrounding view system constructs a three-dimensional model of a panoramic surrounding view according to these images, and simulates environment around the vehicle using the three-dimensional model. Thus, it is helpful for users to better understand a distance between the vehicle and surrounding objects. However, constructed objects in the three-dimensional models are prone to distortion or other issues. This makes it difficult for users to accurately identify the surrounding objects around the vehicle and judge the distance between the vehicle and the surrounding objects according to the three-dimensional model, resulting in increased driving risks for users.

DETAILED DESCRIPTION

Figure 1:
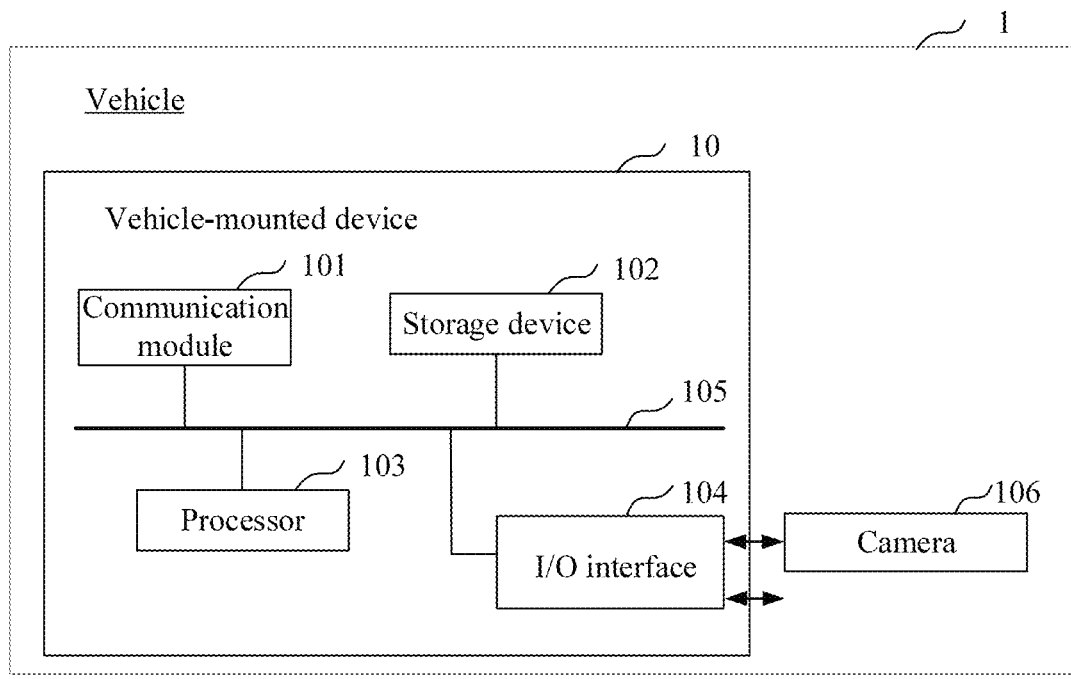
FIG. 1 is a structural diagram of a vehicle-mounted device in an embodiment of the present disclosure.

In order to more clearly understand above objects, features and advantages of the present disclosure, the present disclosure will be described in detail below with reference to accompanying drawings and embodiments. It should be noted that, as long as there is no conflict, the embodiments of the present disclosure and the features in the embodiments can be combined with each other.

The accompanying drawings combined with detailed description illustrate the embodiments of the present disclosure hereinafter. It is noted that the embodiments of the present disclosure and the features of the embodiments can be combined, in response that there is no conflict.

It should be noted that "at least one" in this disclosure refers to one or more, and "multiple" refers to two or more than two. "And/or" describes an association of associated objects, indicating that there can be three relationships. For example, A and/or B can mean: A exists alone, A and B exist simultaneously, and B exists alone, where A, B can be singular or plural. Terms "first", "second", "third", "fourth", etc. (if present) in description, claims and drawings of this disclosure are used to distinguish similar objects, rather than to describe a specific order or sequence.

In the embodiments of this disclosure, words such as "exemplary" or "for example" are used to represent examples, illustrations or explanations. Any embodiment or design described as "exemplary" or "such as" in the embodiments of the present disclosure is not to be construed as preferred or advantageous over other embodiments or designs. Rather, use of words "exemplary" or "such as" is intended to present the concept in a concrete manner. The following embodiments and features in the embodiments may be combined with each other without conflict.

In one embodiment, a panoramic surrounding view system installed inside a vehicle can capture images around the vehicle through cameras, which are installed in the front, rear, left and right of the vehicle. The panoramic surrounding view system constructs a three-dimensional model of a panoramic surrounding view according to these images, and simulates environment around the vehicle using the three-dimensional model. Thus, it is helpful for users to better understand a distance between the vehicle and surrounding objects. However, constructed objects in the three-dimensional models are prone to distortion or other issues. This makes it difficult for users to accurately identify the surrounding objects around the vehicle and judge the distance between the vehicle and the surrounding objects according to the three-dimensional model, resulting in increased driving risks for users.

In order to solve above problems, a method for constructing a 3D panoramic view model is provided. In some embodiments, a vehicle-mounted device identifies a target object in an environment image obtained from a camera of a vehicle, and the vehicle-mounted device determines first coordinates of the target object in a first coordinate system corresponding to the environment image. The vehicle-mounted device converts the environment image to an aerial view from a perspective transformation, and the vehicle-mounted device determines second coordinates of the target object in a second coordinate system corresponding to the aerial view according to the first coordinates. The vehicle-mounted device determines a third coordinate of the target object in a third coordinate system corresponding to the camera according to the second coordinates. The vehicle-mounted device determines a fourth coordinate of the target object in a fourth coordinate system corresponding to the vehicle according to the third coordinate, and the vehicle-mounted device determines an initial distance between the target object and the vehicle according to the fourth coordinate. The vehicle-mounted device determines a target distance according to a preset correction parameter and the initial distance, and the vehicle-mounted device constructs a target 3D panoramic view model of the vehicle according to the target distance and the environment image. By performing the method, distortion of objects in a constructed vehicle 3D panoramic view model can be avoided, a vehicle 3D panoramic view model that is closer to real environment can be obtained, thereby ensuring users' driving safety based on the vehicle 3D panoramic view model.

FIG. 1 is a structural diagram of a vehicle-mounted device in an embodiment of the present disclosure. The embodiment of the present disclosure does not limit any type of the vehicle-mounted device.

As shown in FIG. 1, a vehicle-mounted device 10 can be installed in a vehicle 1. The vehicle-mounted device 10 may include a communication module 101, a storage device 102, a processor 103, an input/output (I/O) interface 104 and a bus 105. The processor 103 is coupled to the communication module 101, the storage device 102, and the I/O interface 104 through the bus 105, respectively.

The communication module 101 may include a wired communication module and/or a wireless communication module. The wired communication module can provide one or more of wired communication solutions such as Universal Serial Bus (USB), Controller Area Network (CAN), Local Interconnect Network (LIN), FlexRay, for example. The Wireless communication module can provide one or more of wireless communication solutions such as wireless fidelity (Wi-Fi), Bluetooth (BT), mobile communication network, frequency modulation (FM), near field communication (NFC), infrared technology.

The storage device 102 may include one or more random access memories (RAM) and one or more non-volatile memories (NVM). The random access memory can be directly read and written by the processor 103. The random access memory can be used to store executable programs (such as machine instructions) of an operating system or other running programs, and can also be used to store user and application data, etc. The random access memory can include static random-access memory (SRAM), dynamic random access memory (DRAM), synchronous dynamic random access memory (SDRAM), double data rate synchronous dynamic random access memory (DDR SDRAM), etc.

The non-volatile memory can also store executable programs and user and application data, etc., and the non-volatile memory can be loaded into the random access memory in advance for directly reading and writing by the processor 103. The non-volatile memory can include disk storage devices and flash memory.

The storage device 102 is used to store one or more computer programs. The one or more computer programs are configured for execution by the processor 103. The one or more computer programs include a plurality of instructions. The plurality of instructions can be executed by the processor 103 for implementing the method for constructing a 3D panoramic view model executed on the vehicle-mounted device 10.

In other embodiments, the vehicle-mounted device 10 further includes an external memory interface for connecting to an external memory to expand a storage capacity of the vehicle-mounted device 10.

The processor 103 may include one or more processing units. For example, the processor 103 may include an application processor (AP), a modem processor, a graphics processing unit (GPU), and an image signal processor (ISP), controller, video codec, digital signal processor (DSP), baseband processor, and/or neural network processing unit (NPU), for example. Different processing units can be independent devices or integrated in one or more processors.

The processor 103 provides computing and control capabilities. For example, the processor 103 is used to execute a computer program stored in the storage device 102 to implement the method for constructing a 3D panoramic view model.

The I/O interface 104 is used to provide a channel for user input or output. For example, the I/O interface 104 can be used to connect various input and output devices, such as a mouse, keyboard, touch device, display screen, etc., so that the user can input information. The I/O interface 104 can be used to visualize information.

The I/O interface 104 may also be used to provide a channel for data transmission with a camera 106. For example, the I/O interface 104 may be used to obtain an environment image of the vehicle from the camera 106.

Figure 2:
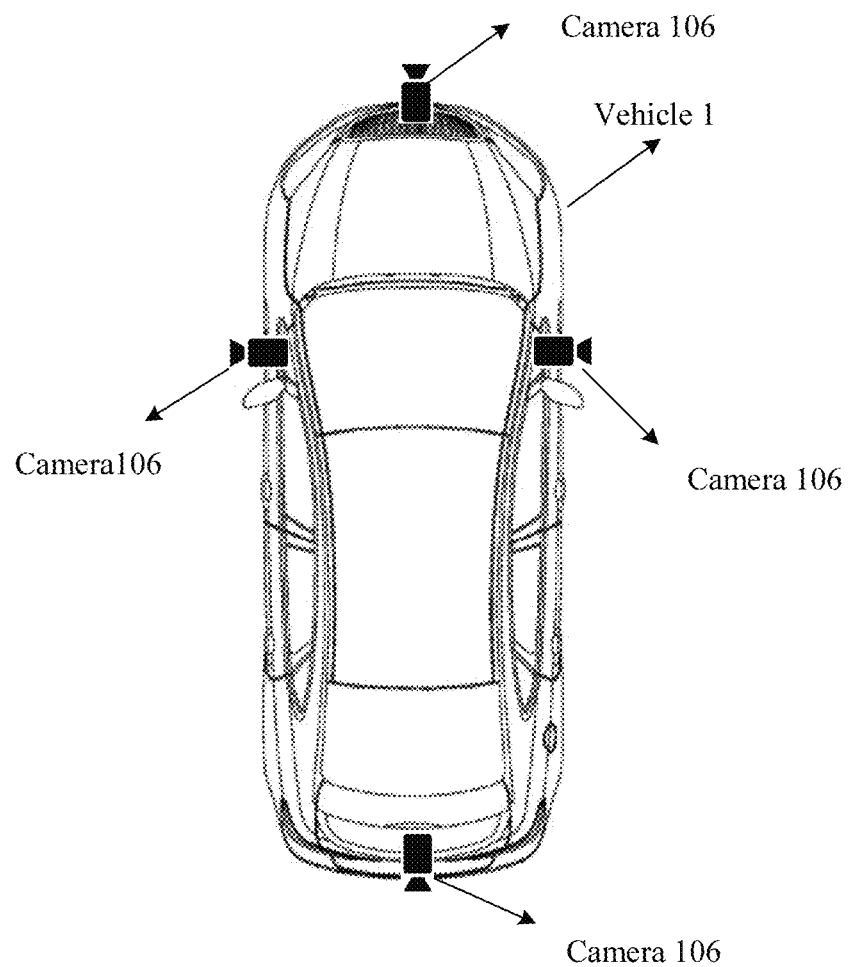
FIG. 2 is an example diagram of an installation position of a camera in a vehicle in an embodiment of the present disclosure.

The camera 106 includes at least one camera installed in the vehicle 1 for capturing environment images of environment where the vehicle 1 is located. The camera 106 may be a fisheye camera, an infrared camera, for example. In one embodiment, as shown in FIG. 2, which shows an example diagram of an installation position of a camera in a vehicle. The camera 106 includes four cameras, which can be installed in the front, rear, left and right four of the vehicle, and a union of the four viewable range of the four cameras can cover a 360-degree range surrounding the vehicle.

The bus 105 is at least used to provide a communication channel between the communication module 101, the storage device 102, the processor 103, and the I/O interface 104 in the vehicle-mounted device 10.

It can be understood that a structure illustrated in the embodiment of the present disclosure does not constitute a specific limitation on the vehicle-mounted device 10. In other embodiments of the present disclosure, the vehicle-mounted device 10 may include more or less components than shown in the figures, or some components may be combined, some components may be separated, or some components may be arranged differently. The components illustrated may be implemented in hardware, software, or a combination of software and hardware.

Figure 3:
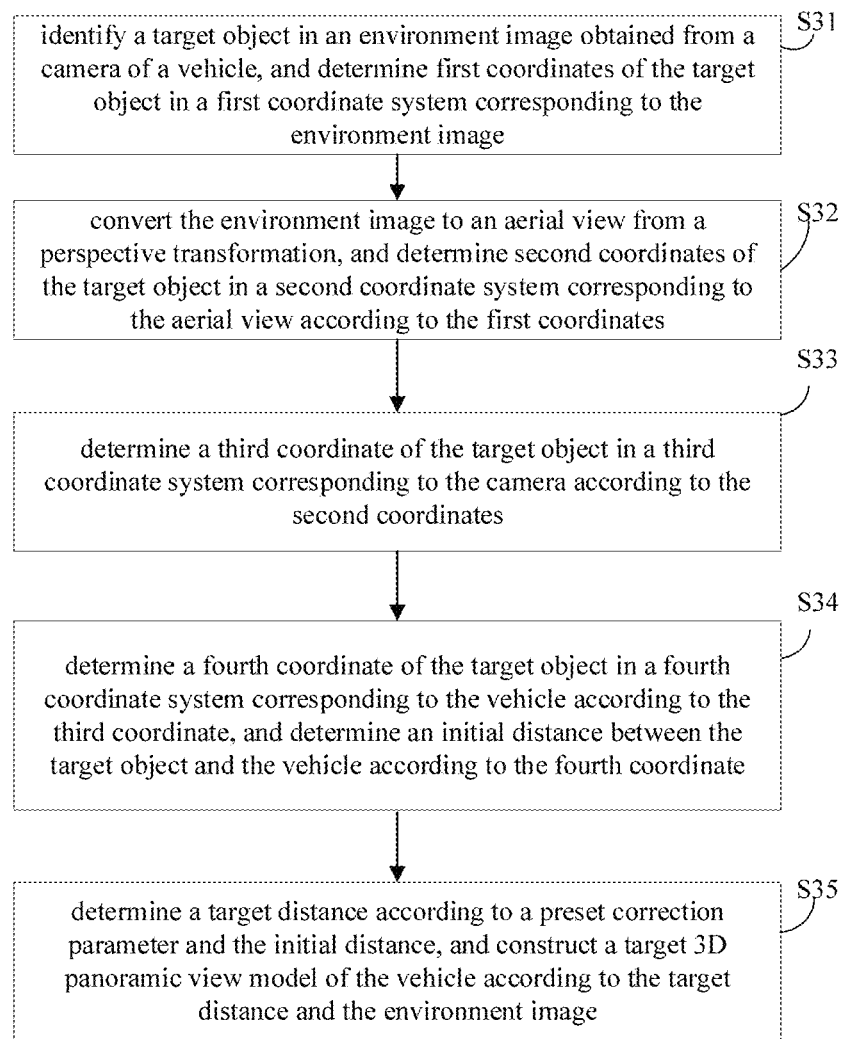
FIG. 3 is a flowchart diagram of a method for constructing a 3D panoramic view model in an embodiment of the present disclosure.

FIG. 3 is a flowchart diagram of a method for constructing a 3D panoramic view model in an embodiment of the present disclosure. The method for constructing a 3D panoramic view model is applied to a vehicle-mounted device, such as the vehicle-mounted device 10 in FIG. 1. According to different needs, an order of the following blocks in the flowchart can be changed, and some of them can be omitted.

In block S31, the vehicle-mounted device identifies a target object in an environment image obtained from a camera of a vehicle, and determines first coordinates of the target object in a first coordinate system corresponding to the environment image.

In one embodiment, at least one camera is installed in the vehicle. The vehicle-mounted device can receive a unique identification of each camera input by a user and an installation position of each camera relative to the vehicle, so as to distinguish cameras installed in different locations. The installation position of each camera relative to the vehicle may include an installation distance of each camera from a center of the vehicle. The installation distance includes a horizontal distance and a vertical distance, and the center of the vehicle represents a center of a top view of the vehicle.

Figure 4:
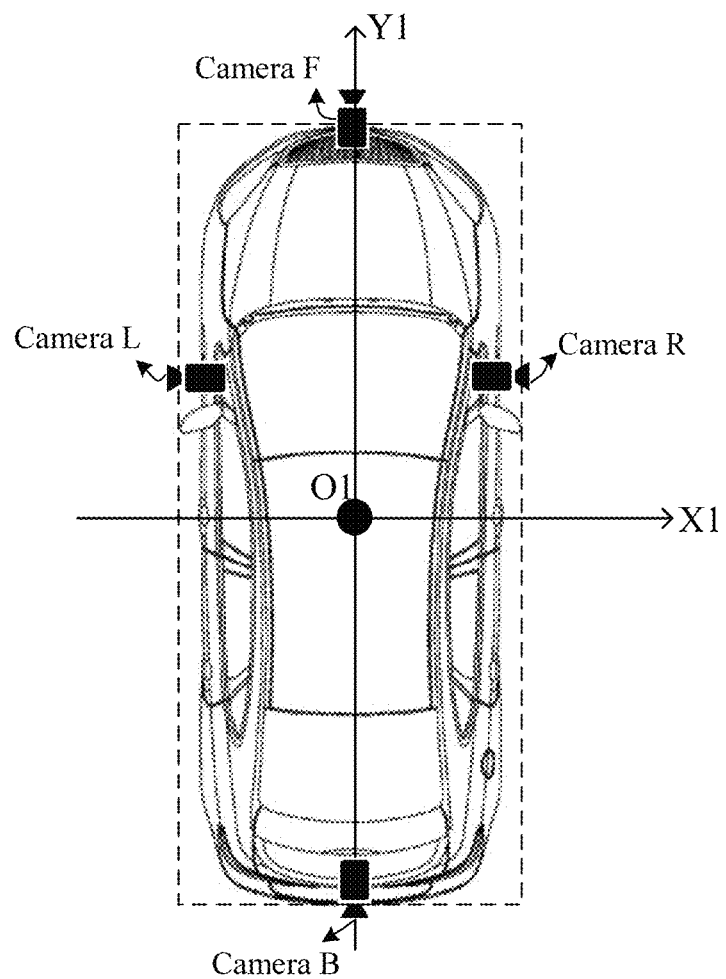
FIG. 4 is an example diagram of an aerial view of the vehicle in an embodiment of the present disclosure.

For example, as shown in FIG. 4, the vehicle-mounted device establishes a rectangular coordinate system O1X1Y1 for the vehicle by taking the center of the top view of the vehicle (e.g., a center of a dotted bounding box) as an origin.

In one embodiment, the vehicle-mounted device defines a direction of front of the vehicle in a top view of the vehicle as front of the vehicle. A camera is installed in the front, rear, left, and right sides of the vehicle. For example, the camera installed in the front of the vehicle is identified as camera F, the camera installed in the rear of the vehicle is identified as camera B, the camera installed on the left side of the vehicle is identified as camera L, and the camera installed on the right side of the vehicle is identified as camera R. The horizontal distance of any camera from the center of the vehicle includes a distance between the camera and Y1 axis, and the vertical distance of any camera from the center of the vehicle includes a distance between the camera and X1 axis. In other embodiments described as follows, an example is provided to describe where camera F and camera B are installed on the Y1 axis as shown in FIG. 4. In other embodiments, in response that camera F or camera B is not installed on the Y1 axis, a translation compensation can be performed during a coordinate transformation to implement corresponding processes.

In one embodiment, before the vehicle-mounted device identifies the target object in the environment image obtained from the camera of the vehicle, the vehicle-mounted device pre-processes the environment image. The vehicle-mounted device resizes the environment image, for example, the vehicle-mounted device adjusts a size of the environment image to a required size of a feature recognition algorithm. The vehicle-mounted device performs an image optimization of the environment image, for example, the vehicle-mounted device improves a texture clarity of the environment image based on an interpolation algorithm, such as a bilinear interpolation algorithm. The vehicle-mounted device performs a grayscale processing of the environment image, for example, the vehicle device converts the environment image into a grayscale image using a weighted average method. The vehicle-mounted device filters the environment image, for example, the vehicle device performs a smooth processing of the environment image by a preset filter, and noise of the environment image can be removed, the preset filter may include a mean filter, a median filter, etc. The vehicle-mounted device performs a distortion correction on the environment image. In response that the camera is a fisheye camera, objects in the environment image may be distorted, the vehicle-mounted device performs a distortion correction on the environment images according to camera parameters of the fisheye camera (such as a focal length, a principal point coordinate, a distortion coefficient, etc.) and a pre-selected correction model (such as a pinhole model, a fisheye model, etc.). By pre-processing the environment image, an accuracy of identifying the target object in the environment image can be improved.

In one embodiment, after the vehicle-mounted device obtains a distortion-corrected environment image corresponding to any camera in the vehicle, in order to obtain a panoramic view of the vehicle from a perspective transformation and construct a 3D panoramic view model of the vehicle, the vehicle-mounted device jointly calibrates all cameras of the vehicle based on a method of checkerboard calibration, thereby converting all environment images captured by all cameras of the vehicle into a same coordinate system.

Specifically, the vehicle-mounted device obtains a checkerboard image of a ground in corresponding direction captured by each camera. The vehicle-mounted device performs an internal parameter calibration and an external parameter calibration for each camera, and the vehicle-mounted device obtains initial camera parameters such as intrinsic parameters and extrinsic parameters of each camera. The vehicle-mounted device extracts target feature points in the checkerboard image in each direction, and performs a feature point matching between the cameras based on the target feature points. The vehicle-mounted device optimizes and updates the initial camera parameters of each camera based on information of the feature point matching by using corresponding manners, such as bundle adjustment. Thus, an updated camera parameters can more accurately align the checkerboard image captured by the corresponding camera. The vehicle-mounted device evaluates an accuracy of the updated camera parameters. In response that an evaluation result indicates that the accuracy of the updated camera parameters is less than a preset accuracy threshold, the vehicle-mounted device repeats above procedure(s) until an accuracy of the updated camera parameters is greater than or equal to the accuracy threshold, and a joint calibration of all cameras is completed.

In one embodiment, the above-mentioned joint calibration process can also determine a world distance corresponding to a length of each pixel in the environment image. For example, it can be determined that the world distance corresponding to the length of each pixel in the environment image is 1 cm.

In one embodiment, for any camera of the vehicle (for example, camera F), the vehicle-mounted device identifies the target object in the environment image using a preset feature recognition algorithm, and generates a rectangular bounding box of the target object in the environment image. The vehicle-mounted device determines coordinates of target corner points of the rectangular bounding box in the first coordinate system, and determines the coordinates of the target corner points to be the first coordinates. The target objects include objects with height, such as vehicles, walls, columns, steps, human bodies and other objects.

In one embodiment, the preset feature recognition algorithm includes one or more of a feature recognition algorithm based on a machine learning model and a feature recognition algorithm based on a deep learning model.

In one embodiment, the feature recognition algorithm based on the machine learning model includes a linear regression algorithm, a support vector regression algorithm, a ridge regression algorithm, a decision tree algorithm, for example. The feature recognition algorithm based on the machine learning model can learn how to classify pixels in the environment image by using a method for supervised learning. An efficiency of feature recognition of the environment image can be improved without relying on display programming to identify features of the environment image.

In one embodiment, the feature recognition algorithm based on the deep learning model includes a variety of neural network structures, such as convolutional neural networks, recurrent neural networks, long short-term memory networks, etc. The vehicle-mounted device extracts low-level features of the environment image based on the feature recognition algorithm based on the deep learning model. The vehicle-mounted device obtains a more abstract high-level representation of the environment image based on the low-level features, and determines distributed features in the environment image based on the high-level representation to realize a feature recognition of the environment image. The vehicle-mounted device can identify features of environment images including complex objects, accuracy and efficiency of feature recognition can be improved.

The vehicle-mounted device identifies the target object in the environment image by using a fully convolutional neural network model. Specifically, the vehicle-mounted device performs a filtering processing on the environment image through convolution operations by using a plurality of convolution layers, and obtains a plurality of scale feature images of the environment image. The vehicle-mounted device performs a nonlinear transformation on an output of the convolution layer using an activation function (such as REL, sigmoid, tanh, etc.) of an activation layer and increases an expressive ability of a network. The vehicle-mounted device reduces a size of the feature images by using a pooling layer, and reduces a number of parameters and a computational complexity of the network. The vehicle-mounted device performs a difference or deconvolution operation on an output of the pooling layer by using a up sampling layer, and restores the size of the feature images and obtains a high-resolution feature representation of the environment image. The vehicle-mounted device connects different layers in the network by using a skip connection mechanism and feature information at different scales in the environment image can be better to obtain. The vehicle-mounted device performs a feature classification based on a semantic segmentation algorithm by using an output layer, and obtains an object category that pixels in the environment image belong to, thus, the vehicle-mounted device can determine the target object in the environment image.

In one embodiment, in order to determine a specific position of the target object in the environment image, a rectangular bounding box of the target object can be generated in the environment image, and then the rectangular bounding box of the target object can be determined in the first coordinate system corresponding to the environment image. The coordinates of the target corner points can be determined to be the first coordinates of the target object in the first coordinate system corresponding to the environment image. The target corner points at least include a bottom left corner point and a bottom right corner point of the rectangular bounding box.

Figure 5:
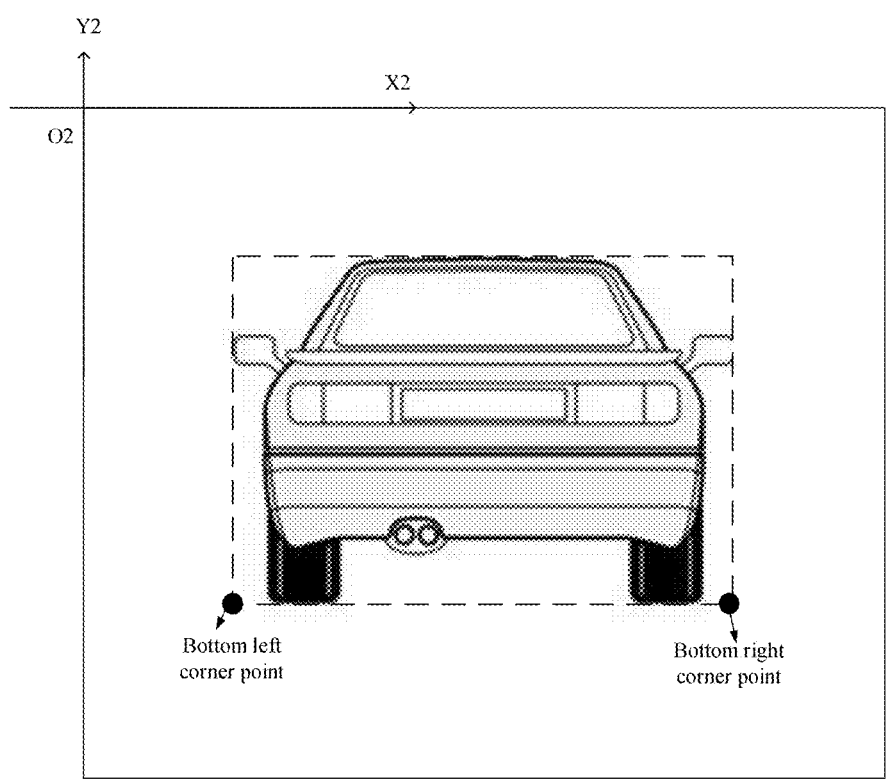
FIG. 5 is an example diagram of first coordinates of a target object in an embodiment of the present disclosure.

For example, as shown in FIG. 5, an example diagram of first coordinates of a target object is provided in an embodiment. The vehicle-mounted device establishes the first coordinate system O2X2Y2, in which an upper left corner point of the environment image captured by camera F is determined as an origin. The vehicle-mounted device generates a rectangular bounding box shown by a dotted line of the target object (for example, a rear view of the vehicle shown in FIG. 5) in the environment image, and determines coordinates (x1, y1) of the bottom left corner point of the rectangular bounding box shown by the dotted line in the first coordinate system and coordinates (x2, y2) of the bottom right corner point in the first coordinate system. The coordinates (x1, y1) and the coordinates (x2, y2) are determined to be the first coordinates.

In block S31, the vehicle-mounted device converts the environment image to an aerial view from a perspective transformation, and determines second coordinates of the target object in a second coordinate system corresponding to the aerial view according to the first coordinates.

In one embodiment, the vehicle-mounted device converts the environment image into a projection transformation of the aerial view from the perspective transformation by using a preset perspective projection matrix of a principle of constructing a two-dimensional panoramic view system (Around View Monitor, AVM).

Specifically, taking the camera F as an example, the vehicle-mounted device captures a first image of the checkerboard on a ground within a viewable range of the camera F based on the method of checkerboard calibration, and captures a second image of the checkerboard by using an auxiliary camera and the camera F. The auxiliary camera is located above the center of the vehicle and a shooting angle of the auxiliary camera is parallel to the ground where the vehicle is located. The vehicle-mounted device determines environment coordinates of a plurality of calibration feature points in the first image in a coordinate system of the first image, and determines a plurality of aerial view coordinates of corresponding to the plurality of calibration feature points in a coordinate system of the second image. The vehicle-mounted device calculates a homograph matrix, which is used to transform the environment coordinates of a plurality of the calibration feature points into the aerial view coordinates of corresponding to the plurality of calibration feature points, and the homograph matrix is determined to be the preset perspective projection matrix.

Figure 6:
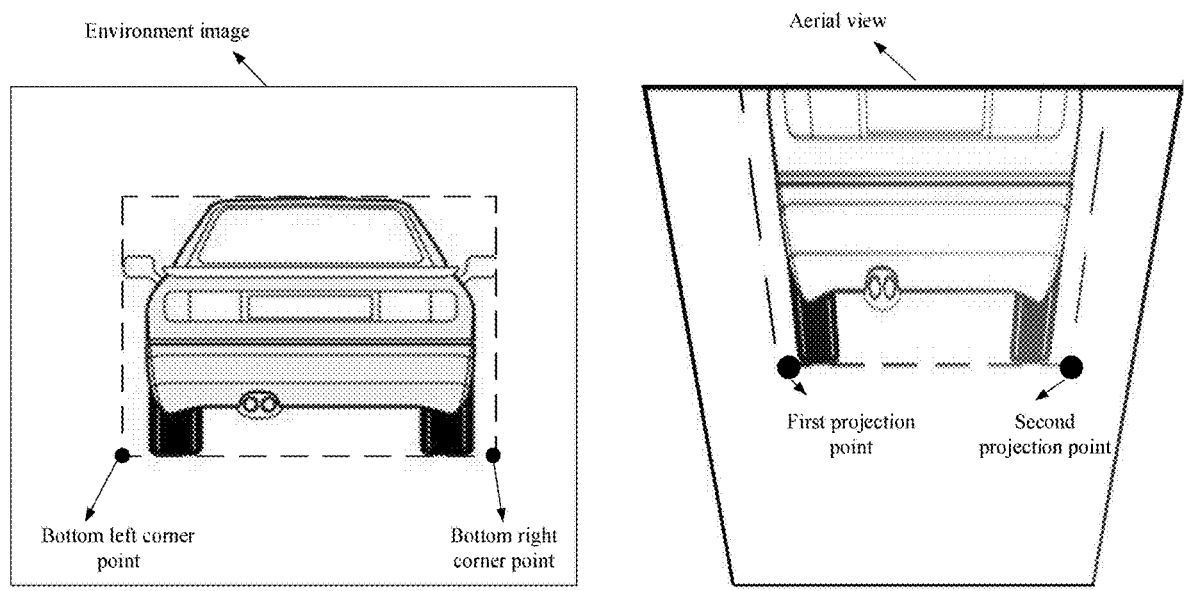
FIG. 6 is an example diagram of an environment image and a corresponding aerial view in an embodiment of the present disclosure.
Figure 7:
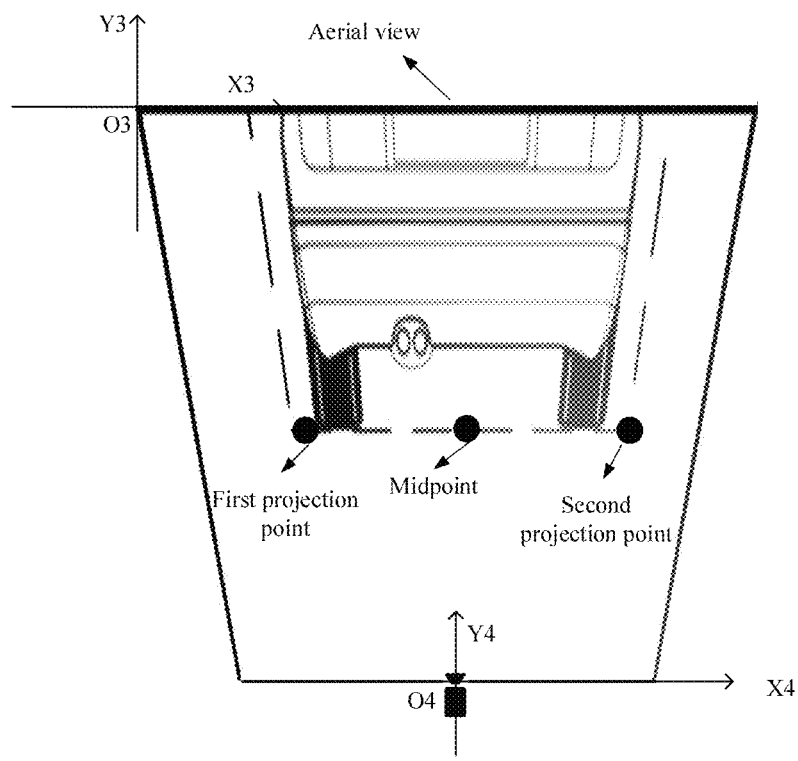
FIG. 7 is an example diagram of a second coordinate system and a third coordinate system in an embodiment of the present disclosure.

In one embodiment, the vehicle-mounted device performs a projection conversion on each pixel point in the environment image by using the preset perspective projection matrix. The vehicle-mounted device obtains the aerial view corresponding to the environment image (as shown in FIG. 6), and a projection point corresponding to each pixel in the environment image in the aerial view, and a coordinate of the projection point in the second coordinate system where the aerial view is located, the second coordinate system may be O3X3Y3 as shown in FIG. 7. Since the world distance corresponding to the length of each pixel in the environment image is a known parameter, the vehicle-mounted device performs a corresponding transformation on the known parameter by using the preset perspective projection matrix, and the world distance corresponding to the length of each pixel in the aerial view can be obtained. For example, as shown in FIG. 6, when the environment image is converted into the aerial view from the perspective transformation, due to a change of perspective, an image closer to a top of the environment image is stretched to a greater extent, and an image closer to a bottom of the environment image is stretched to a smaller extent. For example, the stretched way may include elongated and widened the environment image.

In one embodiment, the vehicle-mounted device performs a projection conversion on the rectangular bounding box of the target object, and obtains a bounding box (a dotted box shown in FIG. 6) of the target object from the perspective transformation in the aerial view, also obtains a projection point corresponding to the bottom left corner point of the rectangular bounding box of the target object, and a projection point corresponding to the bottom right corner point of the rectangular bounding box of the target object. The second coordinates of the target object in the second coordinate system corresponding to the aerial view include a coordinate of a first projection point (as shown in FIG. 6) of the bottom left corner point in the aerial view in the second coordinate system, and a coordinate of a second projection point (as shown in FIG. 6) of the bottom right corner point in the aerial view in the second coordinate system.

Figure 8:
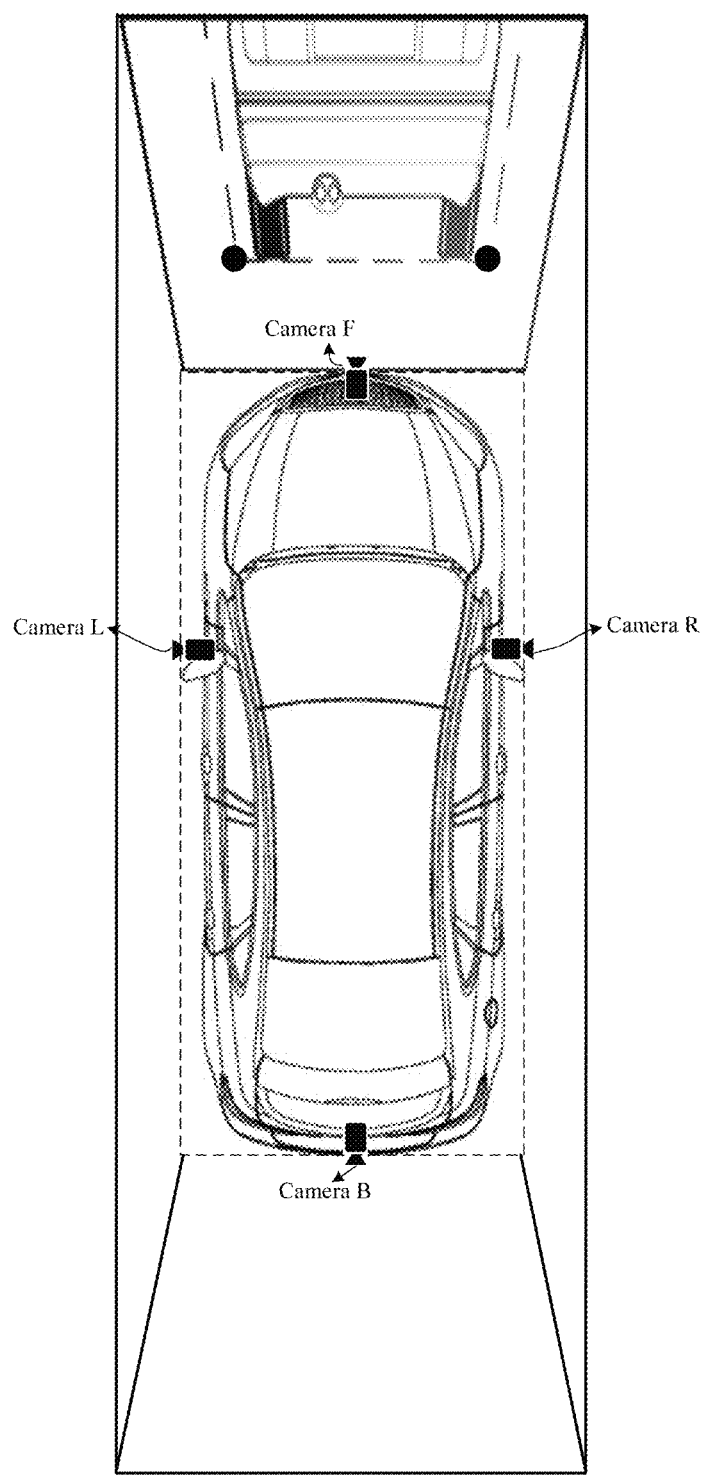
FIG. 8 is an example diagram of a panoramic surround view of the vehicle from a perspective transformation in an embodiment of the present disclosure.

In one embodiment, the vehicle-mounted device has jointly calibrated all cameras in the vehicle in the block S31. On a basis of joint calibration, the vehicle-mounted device obtains a panoramic surround view of the perspective transformation based on the preset perspective projection matrix between the environment image and the aerial view. For example, FIG. 8 is an example diagram of a panoramic surround view of the vehicle from a perspective transformation in an embodiment of the present disclosure.

In block S33, the vehicle-mounted device determines a third coordinate of the target object in a third coordinate system corresponding to the camera according to the second coordinates.

In one embodiment, the vehicle-mounted device determines a midpoint coordinate between a coordinate of the first projection point in the second coordinate system and a coordinate of the second projection point in the second coordinate system. The vehicle-mounted device determines the midpoint coordinate in the third coordinate system to be the third coordinate according to a first transformation relationship between the second coordinate system and the third coordinate system.

In one embodiment, in order to facilitate calculation, the vehicle-mounted device calculates a distance between the target object and the corresponding camera by using the midpoint coordinates, and converts the second coordinates of the target object in the aerial view into the third coordinate in the coordinate system corresponding to the camera.

Specifically, taking the camera F as an example, as shown in FIG. 7, a center of a viewable range of the camera is located on a central vertical line of the environment image, and a bottom boundary of the aerial view is a front boundary of the vehicle, the bottom boundary of the aerial view also represents an installation position of the camera F. Therefore, a center position of the bottom boundary of the aerial view is the location of each camera. The vehicle-mounted device establishes the third coordinate system O4X4Y4 where the camera is located by using the center position of the bottom boundary of the aerial view as an origin.

In one embodiment, since both of the second coordinate system and the third coordinate system are rectangular coordinate systems, the vehicle-mounted device determines a positional relationship between an origin of the second coordinate system and an origin of the third coordinate system, and determines the first transformation relationship between the second coordinate system and the third coordinate system based on the positional relationship. Specifically, the vehicle-mounted device determines a length W and a width H of the aerial view based on a length and a width of the environment image by a projection transformation matrix. the length W of the aerial view can be a length of a side (for example, a upper boundary of the aerial view in FIG. 7) where the origin of the second coordinate system is located, and the width H of the aerial view may be a distance between two mutually parallel boundaries (for example, the upper boundary and a bottom boundary of the aerial view in FIG. 7) of the aerial view. For example, a coordinate of the origin of the third coordinate system in the second coordinate system are (W/2, −H), the first transformation relationship is determined based on the positional relationship between the origin of the second coordinate system and the origin of the third coordinate system. In relation to the first transformation relationship, in response that a coordinate of any point in the second coordinate system is (x4, y4), a coordinate of any point in the third coordinate system is determined to be (x5, y5)=(−x4+W/2, H−|y4|).

In one embodiment, the vehicle-mounted device determines a coordinate (−x3+W/2, H−|y3|) of the midpoint coordinate (x3, y3) in the third coordinate system as the third coordinate according to the first transformation relationship between the second coordinate system and the third coordinate system.

In one embodiment, since the world distance corresponding to the length of each pixel in the environment image and the aerial view is a known parameter, the world distance between the target object and the camera can be determined based on the third coordinate. Specifically, the world distance between the target object and the camera may be a Euclidean distance between the third coordinate and the origin of the third coordinate system.

In one embodiment, for any camera, since the environment image may include a plurality of target objects, in order to avoid distortion in the target 3D panoramic view model constructed in subsequent blocks, the vehicle-mounted device determines a distance between each target object in the environment image and the corresponding camera, and the target 3D panoramic view model is constructed based on the target object corresponding to a minimum distance.

In block S34, the vehicle-mounted device determines a fourth coordinate of the target object in a fourth coordinate system corresponding to the vehicle according to the third coordinate, and the vehicle-mounted device determines an initial distance between the target object and the vehicle according to the fourth coordinate.

In one embodiment, the vehicle-mounted device determines installation distances between the camera and a center of the vehicle in the overhead perspective, the installation distances include a horizontal distance and a vertical distance. The vehicle-mounted device determines a second conversion relationship between the third coordinate system and the fourth coordinate system according to the installation distances, and converts the third coordinate to the fourth coordinate according to the second conversion relationship. An origin of the fourth coordinate system is located at the center of the vehicle.

Figure 9:
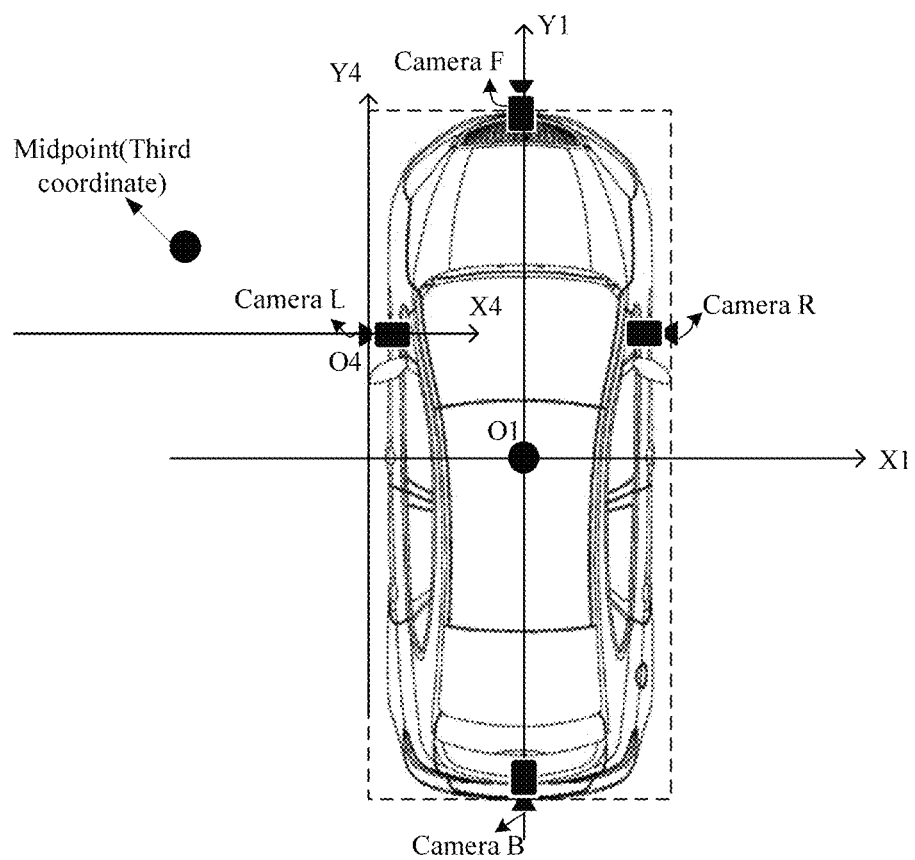
FIG. 9 is an example diagram of a third coordinate system and a fourth coordinate system in an embodiment of the present disclosure.

In one embodiment, the camera L is used as an example. For example, FIG. 9 is an example diagram of a third coordinate system and a fourth coordinate system in an embodiment of the present disclosure. As shown in FIG. 9, O1X1Y1 represents the fourth coordinate system, in which the center of the vehicle is determined as an origin, and O4X4Y4 represents the third coordinate system corresponding to the camera L.

In one embodiment, a method for determining the second conversion relationship is similar to a method for determining the first conversion relationship. The horizontal distance and the vertical distance between the camera (for example, the camera L) and the center of the vehicle in the aerial view are known parameters (refer to block S31), the second transformation relationship may include a translation transformation of the third coordinate based on the horizontal distance and the vertical distance. Descriptions of the method for determining the second conversion relationship may refer to the method for determining the first transformation relationship.

In one embodiment, the vehicle-mounted device determines a Euclidean distance between the fourth coordinate and a center of the vehicle as the initial distance.

In block S35, the vehicle-mounted device determines a target distance according to a preset correction parameter and the initial distance, and constructs a target 3D panoramic view model of the vehicle according to the target distance and the environment image.

In one embodiment, the vehicle-mounted device determines the target distance according to a difference between the initial distance and the preset correction parameter. The vehicle-mounted device constructs a three-dimensional bowl shaped mesh model by using the target distance as a bottom radius, and obtains the target 3D panoramic view model by projecting environment images of the vehicle in four directions onto the three-dimensional bowl shaped mesh model. A bottom of the three-dimensional bowl shaped mesh model is centered around the center of the vehicle.

Figure 10:
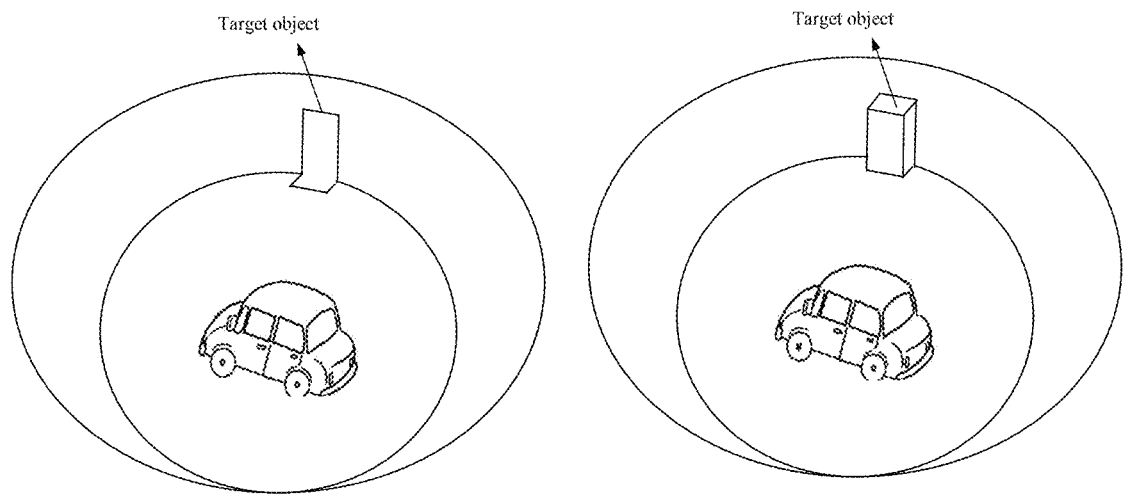
FIG. 10 is an example diagram of a 3D panoramic view model in an embodiment of the present disclosure.

In some embodiments, FIG. 10 is an example diagram of a 3D panoramic view model in an embodiment of the present disclosure. The 3D panoramic view model uses the three-dimensional bowl shaped mesh model. The vehicle device projects the environment image of the vehicle in four directions onto the three-dimensional bowl shaped mesh model, and the 3D panoramic view model of the vehicle is obtained. A model on the left in FIG. 10 is a model established by directly using the initial distance as the bottom radius of the three-dimensional bowl shaped mesh model. Comparing to a model on the right, the model on the left can be seen that the target object of a cylinder appears distortion at a bottom of a bowl. In order to avoid distortion problems, the vehicle device corrects the initial distance so that the target object can be projected to an inside of a bowl wall as a whole during projection, as shown in the model on the right of FIG. 10.

In one embodiment, the vehicle device determines a category of the target object, determines a width of the target object based on the category, and the width of the target object as the preset correction parameter. For example, in response that a category of the target object is a human body, an average width of the human body can be used as the preset correction parameter. In another embodiment, parameters input by a user may also be used as the preset correction parameter.

In one embodiment, by using the difference between the initial distance and the preset correction parameter as the target distance, the target object can be projected to an outside of the three-dimensional bowl shaped mesh model with the target distance as the bottom radius, thereby projecting the target object onto the bowl wall of the three-dimensional bowl shaped mesh model, and avoiding distortion of the target object during projection. In response that the vehicle is driving, by continuously determining the target object and the preset correction parameter corresponding to the target object, it can be ensured that there is no distortion in the vehicle's 3D panoramic view model at each moment, thereby ensuring the user's driving safety.

In one embodiment, in response that the target 3D panoramic view model has distortion, the vehicle device updates the target 3D panoramic view model. Specifically, the vehicle device reduces the bottom radius of the three-dimensional bowl shaped mesh model by using an updated correction parameters. The vehicle device may receive a determination result of the user driving the vehicle on whether the target 3D panoramic view model is distorted.

In one embodiment, the method for constructing a 3D panoramic view model is provided. In some embodiments, the vehicle-mounted device identifies the target object in an environment image obtained from the camera of the vehicle, and determines first coordinates of the target object in the first coordinate system corresponding to the environment image. The vehicle-mounted device converts the environment image to the aerial view from the perspective transformation, and determines second coordinates of the target object in the second coordinate system corresponding to the aerial view according to the first coordinates. The vehicle-mounted device determines the third coordinate of the target object in the third coordinate system corresponding to the camera according to the second coordinates. The vehicle-mounted device determines the fourth coordinate of the target object in the fourth coordinate system corresponding to the vehicle according to the third coordinate, and determines the initial distance between the target object and the vehicle according to the fourth coordinate. The vehicle-mounted device determines the target distance according to the preset correction parameter and the initial distance, and constructs the target 3D panoramic view model of the vehicle according to the target distance and the environment image. By performing the method, distortion of objects in the constructed vehicle 3D panoramic view model can be avoided, the vehicle 3D panoramic view model that is closer to real environment can be obtained, thereby ensuring users' driving safety based on the vehicle 3D panoramic view model, and reducing users' property losses caused by vehicle collisions.

Figure 11:
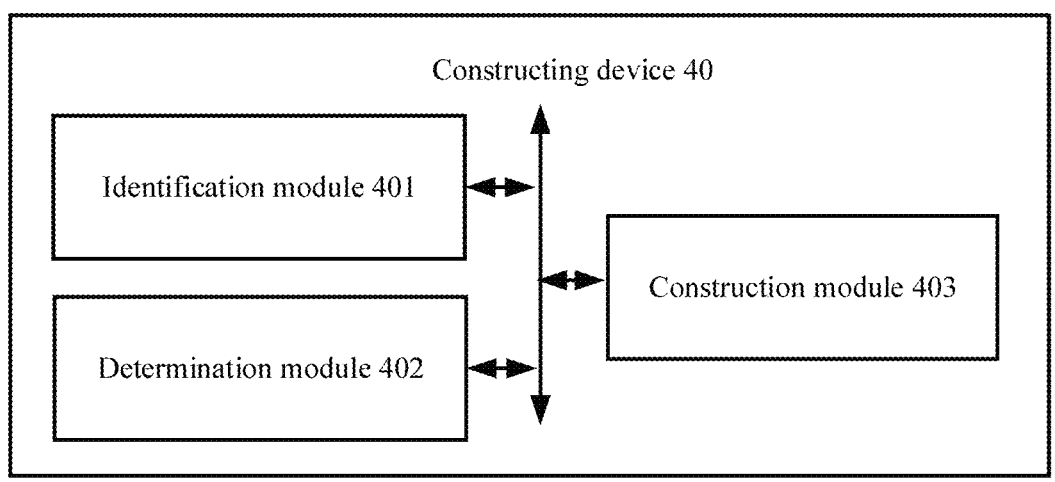
FIG. 11 is a structural diagram of a constructing device in an embodiment of the present disclosure.

FIG. 11 is a structural diagram of a constructing device in an embodiment of the present disclosure.

In some embodiments, the constructing device 40 may include multiple functional modules composed of computer program segments. The computer program of each program segment in the constructing device 40 can be stored in the storage device of the vehicle-mounted device and executed by at least one processor to perform a function for constructing a 3D panoramic view model (see FIG. 3 for details).

In one embodiment, the constructing device 40 can be divided into multiple functional modules according to the functions it performs. The functional modules may include an identification module 401, a determination module 402, and a construction module 403. The module referred to in this disclosure refers to a series of computer program segments that can be executed by at least one processor and can complete a fixed function, which are stored in the storage device. In this embodiment, regarding the functional implementation of each module in the constructing device, please refer to above limitations on the method for constructing a 3D panoramic view model, and a description will not be repeated here.

The identification module 401 identifies a target object in an environment image obtained from a camera of a vehicle, and determines first coordinates of the target object in a first coordinate system corresponding to the environment image. The determination module 402 converts the environment image to an aerial view from a perspective transformation, and determines second coordinates of the target object in a second coordinate system corresponding to the aerial view according to the first coordinates. The determination module 402 determines a third coordinate of the target object in a third coordinate system corresponding to the camera according to the second coordinates. The determination module 402 determines a fourth coordinate of the target object in a fourth coordinate system corresponding to the vehicle according to the third coordinate, and the determination module 402 determines an initial distance between the target object and the vehicle according to the fourth coordinate. The construction module 403 determines a target distance according to a preset correction parameter and the initial distance, and the construction module 403 constructs a target 3D panoramic view model of the vehicle according to the target distance and the environment image.

A computer-readable storage medium is also provided in the present disclosure. A computer program is stored on the computer-readable storage medium. The computer program includes program instructions. A method implemented when the program instructions are executed may refer to methods in above-mentioned embodiments of this disclosure.

The computer-readable storage medium may be an internal memory of the vehicle-mounted device described in the above embodiment, such as a hard disk or memory of the vehicle-mounted device. The computer-readable storage medium may also be an external storage device of the vehicle-mounted device, such as a plug-in hard disk, a Smart Media Card (SMC), or a Secure Digital (SD) card, a Flash Card, etc. equipped on the vehicle-mounted device.

In some embodiments, the computer-readable storage medium may include a storage program area and a storage data area, wherein the storage program area may store an operating system, at least one application program required for a function, etc. The storage data area may store data created based on a use of the vehicle-mounted device, etc.

In the above embodiments, each embodiment is described with its own emphasis. For parts that are not detailed or documented in a certain embodiment, please refer to relevant descriptions of other embodiments.

In the several embodiments provided in the preset disclosure, the disclosed vehicle-mounted device and method can be implemented in other ways. For example, the embodiments of the devices described above are merely illustrative. For example, a division of the modules is based on logical function only, and there can be other manners of division in actual implementation.

In addition, each functional module in each embodiment of the present disclosure can be integrated into one processing module, or can be physically present separately in each unit, or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for constructing a 3D panoramic view model, comprising:
    identifying a target object in an environment image obtained from a camera of a vehicle, and determining first coordinates of the target object in a first coordinate system corresponding to the environment image;
    converting the environment image to an aerial view from a perspective transformation, and determining second coordinates of the target object in a second coordinate system corresponding to the aerial view according to the first coordinates;
    determining a third coordinate of the target object in a third coordinate system corresponding to the camera according to the second coordinates;
    determining a fourth coordinate of the target object in a fourth coordinate system corresponding to the vehicle according to the third coordinate, and determining an initial distance between the target object and the vehicle according to the fourth coordinate; and
    determining a target distance according to a preset correction parameter and the initial distance, and constructing a target 3D panoramic view model of the vehicle according to the target distance and the environment image.

2. The method of claim 1, wherein identifying the target object in the environment image obtained from the camera of the vehicle, and determining the first coordinates of the target object in the first coordinate system corresponding to the environment image comprises:
    identifying the target object in the environment image using a preset feature recognition algorithm, and generating a rectangular bounding box of the target object in the environment image;
    determining coordinates of target corner points of the rectangular bounding box in the first coordinate system, and determining the coordinates of the target corner points to be the first coordinates.

3. The method of claim 2, wherein the preset feature recognition algorithm comprises one or more of a feature recognition algorithm based on a machine learning model and a feature recognition algorithm based on a deep learning model.

4. The method of claim 2, wherein the target corner points comprise a bottom left corner point and a bottom right corner point of the rectangular bounding box, the second coordinates comprise a coordinate of a first projection point of the bottom left corner point in the aerial view in the second coordinate system, and a coordinate of a second projection point of the bottom right corner point in the aerial view in the second coordinate system.

5. The method of claim 4, wherein determining the third coordinate of the target object in the third coordinate system corresponding to the camera according to the second coordinates comprises:
    determining a midpoint coordinate between a coordinate of the first projection point in the second coordinate system and a coordinate of the second projection point in the second coordinate system;
    determining the midpoint coordinate in the third coordinate system to be the third coordinate according to a first transformation relationship between the second coordinate system and the third coordinate system.

6. The method of claim 1, wherein determining the fourth coordinate of the target object in the fourth coordinate system corresponding to the vehicle according to the third coordinate comprises:
    determining installation distances between the camera and a center of the vehicle in the overhead perspective, the installation distances comprising a horizontal distance and a vertical distance;
    determining a second conversion relationship between the third coordinate system and the fourth coordinate system according to the installation distances, and converting the third coordinate to the fourth coordinate according to the second conversion relationship, an origin of the fourth coordinate system being located at the center of the vehicle.

7. The method of claim 1, wherein determining the initial distance between the target object and the vehicle according to the fourth coordinate comprises:
    determining a Euclidean distance between the fourth coordinate and a center of the vehicle as the initial distance.

8. The method of claim 1, wherein determining the target distance according to the preset correction parameter and the initial distance, and constructing the target 3D panoramic view model of the vehicle according to the target distance and the environment image comprises:
    determining the target distance according to a difference between the initial distance and the preset correction parameter;
    constructing a three-dimensional bowl shaped mesh model by using the target distance as a bottom radius, and obtaining the target 3D panoramic view model by projecting environment images of the vehicle in four directions onto the three-dimensional bowl shaped mesh model.

9. A vehicle-mounted device comprising:
a processor; and
a storage device storing a plurality of instructions, which when executed by the processor, cause the processor to:
identify a target object in an environment image obtained from a camera of a vehicle, and determine first coordinates of the target object in a first coordinate system corresponding to the environment image;
convert the environment image to an aerial view from a perspective transformation, and determine second coordinates of the target object in a second coordinate system corresponding to the aerial view according to the first coordinates;
determine a third coordinate of the target object in a third coordinate system corresponding to the camera according to the second coordinates;
determine a fourth coordinate of the target object in a fourth coordinate system corresponding to the vehicle according to the third coordinate, and determine an initial distance between the target object and the vehicle according to the fourth coordinate; and
determine a target distance according to a preset correction parameter and the initial distance, and construct a target 3D panoramic view model of the vehicle according to the target distance and the environment image.

10. The vehicle-mounted device of claim 9, wherein the processor is further caused to:
identify the target object in the environment image using a preset feature recognition algorithm, and generate a rectangular bounding box of the target object in the environment image;
determine coordinates of target corner points of the rectangular bounding box in the first coordinate system, and determine the coordinates of the target corner points to be the first coordinates.

11. The vehicle-mounted device of claim 10, wherein the target corner points comprise a bottom left corner point and a bottom right corner point of the rectangular bounding box, the second coordinates comprise a coordinate of a first projection point of the bottom left corner point in the aerial view in the second coordinate system, and a coordinate of a second projection point of the bottom right corner point in the aerial view in the second coordinate system.

12. The vehicle-mounted device of claim 11, wherein the processor is further caused to:
determine a midpoint coordinate between a coordinate of the first projection point in the second coordinate system and a coordinate of the second projection point in the second coordinate system;
determine the midpoint coordinate in the third coordinate system to be the third coordinate according to a first transformation relationship between the second coordinate system and the third coordinate system.

13. The vehicle-mounted device of claim 9, wherein the processor is further caused to:
determine installation distances between the camera and a center of the vehicle in the overhead perspective, the installation distances comprising a horizontal distance and a vertical distance;
determine a second conversion relationship between the third coordinate system and the fourth coordinate system according to the installation distances, and convert the third coordinate to the fourth coordinate according to the second conversion relationship, an origin of the fourth coordinate system being located at the center of the vehicle.

14. The vehicle-mounted device of claim 9, wherein the processor is further caused to:
determine the target distance according to a difference between the initial distance and the preset correction parameter;
construct a three-dimensional bowl shaped mesh model by using the target distance as a bottom radius, and obtain the target 3D panoramic view model by projecting environment images of the vehicle in four directions onto the three-dimensional bowl shaped mesh model.

15. A non-transitory storage medium having stored thereon at least one computer-readable instructions, which when executed by a processor of a vehicle-mounted device, causes the processor to perform a method for constructing a 3D panoramic view model, the method comprising:
identifying a target object in an environment image obtained from a camera of a vehicle, and determining first coordinates of the target object in a first coordinate system corresponding to the environment image;
converting the environment image to an aerial view from a perspective transformation, and determining second coordinates of the target object in a second coordinate system corresponding to the aerial view according to the first coordinates;
determining a third coordinate of the target object in a third coordinate system corresponding to the camera according to the second coordinates;
determining a fourth coordinate of the target object in a fourth coordinate system corresponding to the vehicle according to the third coordinate, and determining an initial distance between the target object and the vehicle according to the fourth coordinate; and
determining a target distance according to a preset correction parameter and the initial distance, and constructing a target 3D panoramic view model of the vehicle according to the target distance and the environment image.

16. The non-transitory storage medium of claim 15, wherein identifying the target object in the environment image obtained from the camera of the vehicle, and determining the first coordinates of the target object in the first coordinate system corresponding to the environment image comprises:
identifying the target object in the environment image using a preset feature recognition algorithm, and generating a rectangular bounding box of the target object in the environment image;
determining coordinates of target corner points of the rectangular bounding box in the first coordinate system, and determining the coordinates of the target corner points to be the first coordinates.

17. The non-transitory storage medium of claim 16, wherein the target corner points comprise a bottom left corner point and a bottom right corner point of the rectangular bounding box, the second coordinates comprise a coordinate of a first projection point of the bottom left corner point in the aerial view in the second coordinate system, and a coordinate of a second projection point of the bottom right corner point in the aerial view in the second coordinate system.

18. The non-transitory storage medium of claim 17, wherein determining the third coordinate of the target object in the third coordinate system corresponding to the camera according to the second coordinates comprises:
- determining a midpoint coordinate between a coordinate of the first projection point in the second coordinate system and a coordinate of the second projection point in the second coordinate system;
- determining the midpoint coordinate in the third coordinate system to be the third coordinate according to a first transformation relationship between the second coordinate system and the third coordinate system.

19. The non-transitory storage medium of claim 15, wherein determining the fourth coordinate of the target object in the fourth coordinate system corresponding to the vehicle according to the third coordinate comprises:
- determining installation distances between the camera and a center of the vehicle in the overhead perspective, the installation distances comprising a horizontal distance and a vertical distance;
- determining a second conversion relationship between the third coordinate system and the fourth coordinate system according to the installation distances, and converting the third coordinate to the fourth coordinate according to the second conversion relationship, an origin of the fourth coordinate system being located at the center of the vehicle.

20. The non-transitory storage medium of claim 15, wherein determining the target distance according to the preset correction parameter and the initial distance, and constructing the target 3D panoramic view model of the vehicle according to the target distance and the environment image comprises:
- determining the target distance according to a difference between the initial distance and the preset correction parameter;
- constructing a three-dimensional bowl shaped mesh model by using the target distance as a bottom radius, and obtaining the target 3D panoramic view model by projecting environment images of the vehicle in four directions onto the three-dimensional bowl shaped mesh model.

* * * * *